Figure 3:
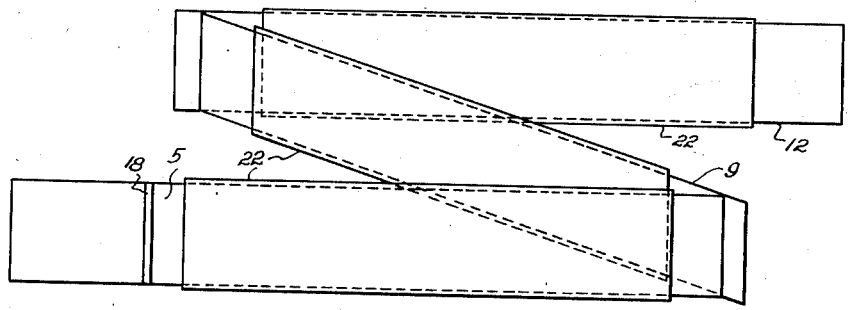

April 15, 1952     J. I. McASKILL     2,593,326
PROCESS FOR CONDITIONING AND GRANULATING
FINELY DIVIDED MATERIALS
Filed July 22, 1949

INVENTOR.
J. I. McAskill
BY Alex E. MacRae

Patented Apr. 15, 1952

2,593,326

UNITED STATES PATENT OFFICE 2,593,326

PROCESS FOR CONDITIONING AND GRANULATING FINELY DIVIDED MATERIALS

James I. McAskill, Kingston, Ontario, Canada

Application July 22, 1949, Serial No. 106,154

7 Claims. (Cl. 241—17)

This invention relates to a process and apparatus for conditioning and granulating finely divided materials and is particularly adapted to conditioning and granulating the finely divided materials used in the manufacture of floor and wall tile.

In the manufacture of floor and wall tile the raw materials fall into two basic groups, plastic and non-plastic. The plastic materials are clays and the non-plastic materials are principally talc, pyrophollite, flint, feldspar and nepheline syenite. A typical composition of wall tile is ball clay 14–16%, kaolin 18–22%, pyrophollite 20–25% and talc 35–45%. These materials are carefully weighed, proportioned and mixed together prior to forming by the dry press process into tile shapes. There are two well known processes for preparing the materials namely the "Wet Mix" process and the "Dry Mix" process. The former process provides the better product but is more costly in operation.

To produce a strong tile it is necessary to have a composition composed of a high percentage of grain or granules of graded size. The term grain or granule as used hereinafter is intended to define a united number of dust-like particles and may be of any desired size. For example, finely divided particles (200 mesh) are wetted and dried to form lumps and such lumps are crushed to form the grains or granules.

In the "Wet Mix" process the raw materials after careful weighing are charged into large tanks or blungers where they are agitated by revolving paddle wheels, sufficient hot water being added to bring the mix to the consistency of cream. The mix or slip as it is now known is passed through a fine wire mesh vibrating screen to a slip storage tank. The slip is pumped from the storage tank to a filter press where the moisture is reduced to 25–30%. The resulting filter cake is dried to bone dryness. The bone dry filter cake is tempered with approximately 8% moisture, is disintegrated or pulverized by means of hammer mills or dry pans, and is passed over a 10 mesh vibratory screen to a dust storage tank. The dust is usually aged for approximately 24 hours and then it is ready to be pressed in steel dies into the desired tile shapes. The green tile from the press is now fired in a furnace and the resulting biscuit is treated with a glaze composition of the desired type and colour. The glazed biscuit is charged to a furnace from which it is discharged as the finished tile. The usual sizes for wall tile are 4″ x 4″, 6″ x 6″ and 6″ x 3″ with a thickness of ⅜″ to ¼″.

The "Dry Mix" process was developed to short cut many of the steps in the cumbersome "Wet Mix" process by dry mixing the various tile ingredients with only enough water to temper the materials for the next step. It was found that to do this it was necessary to use very finely divided ingredients, about −200 mesh. In the conventional "Dry Mix" process the air floated clays and non-plastics are weighed and charged into the mixer along with approximately 6 to 8% water. The ingredients are blended together and thoroughly mixed by means of plows and mullers. The mullers blend the ingredients between their own revolving faces and the bottom of the mixing pan, which combined rolling and sliding action tends to squeeze and mix the particles together. After thorough mixing the tile composition is usually passed through a comminutor or hammer mill which breaks up any large lumps that may have formed. The material is now ready to be pressed in steel dies into the desired tile shapes and thence to the finished tile as previously described.

The "Dry Mix" process proved to be satisfactory in the production of dinnerware and electrical porcelain because in the "pugging" operation the addition of water renders the material suitable for plastic working. However in dry mixing the ingredients for dry pressing of tile it was found that very serious problems arose due to the fact that water in excess of 8% caused die sticking and consequent defective tiles and slow production, because the dies have to be cleaned frequently. If the moisture content is lower than 8% the mixture is undesirably fluffy, with a low bulk density and when pressed gives a tile having very low green strength and low fired strength. Moreover, the problem of wind puffing and lamination became severe. Bulk density means the weight per cubic foot of the pulverized mixture ready to be pressed. It will be appreciated that as the bulk density decreases the entrapped air in the material increases and, in dry pressing, this entrapped air must be expelled to produce the tile. In expelling relatively large amounts of entrapped air, wind or air puffing in the mass occurs during movement of the die. Such puffing results in layering or laminations in the green tile.

The principal advantage of the "Wet Mix" process has been that it was possible to produce a tile composition dust with a sufficiently high bulk density to ensure fairly good pressing characteristics; however, the process is costly as it involves at least six more operations than the "Dry Mix" process and the labour required may be four to five times as many man hours per ton of material as in the "Dry Mix" process. The "Wet Mix" process requires much greater space and greater cost of equipment for a given tonage of production than the "Dry Mix" process.

The "Wet Mix" process is difficult to control precisely and there are constant variations in moisture content, bulk density and grain size of the material. This variation causes either die sticking if the material is too wet or laminations if the material is either too wet or too dry. Where automatic presses are being used it is vitally important that the physical characteristics of the material being fed to them be constant, with moisture, bulk density and grain sizes closely controlled. If the size of the grains is allowed to be greater than $\frac{1}{16}$ inch, differential shrinkage occurs on firing and the face of the tile will have a pock-marked appearance. This means that, when the tile is glazed, the glazed surface will show dimples or else the glaze must be applied to an excessive thickness in order to cover up the dimpled surface. In the "Dry Mix" process grains can be allowed to sizes of $\frac{1}{8}$ inch without showing the objectionable pock marking.

The advantages of the "Dry Mix" process are apparent from the foregoing but the disadvantages are such that in many plants the process has not been adopted. In the "Dry Mix" process, if the moisture content is increased to increase the proportion of granules and overcome the fluffiness of the materials, i. e. increase the bulk density, there is the immediate problem of die sticking, hence reduced production and more cull tiles. It is also found that even by this process it is difficult to control the moisture content within the limits of satisfactory press operation. Furthermore the tile produced by the "Dry Mix" process are weaker mechanically than those of the "Wet Mix" process and hence greater losses are encountered in handling. Perhaps the chief disadvantage, other than the low percentage of grains present and the greatly decreased bulk density which reduces the capacity of the mullers, is the much greater depth of die cavity which must be provided to get the standard tile thickness. This means that the automatic presses must be operated slowly in order to permit escape of the air.

It is an object of this invention to provide a cheap, inexpensive, and simply operated process for producing tile wherein the disadvantages inherent in both the conventional "Wet Mix" and "Dry Mix" processes are substantially overcome.

It is a further object of the invention to provide a method for treating finely divided tile ingredients to produce a material for the manufacture of tile having a high bulk density with resultant elimination of laminations and wind puffing, and a large percentage of grains, and wherein the moisture content is closely controlled to prevent die sticking and uneven tiles to ensure fast and efficient die pressing.

It is a further object of this invention to provide a method for producing a granular product from any finely ground dust-like material.

The present invention provides a process for conditioning tile ingredients comprising adding substantially 9–15% water to the finely divided ingredients, thoroughly mixing the ingredients and water, crushing the mixture, drying the crushed mixture until the moisture content is reduced to not more than 8%, further crushing the dried mixture and screening the resultant mixture to remove oversize grains.

Figure 2:
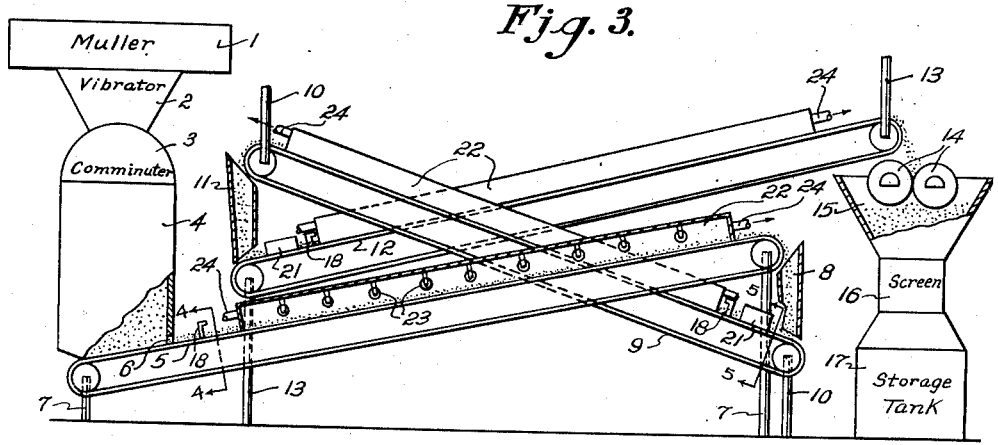
Figures 1, 6:
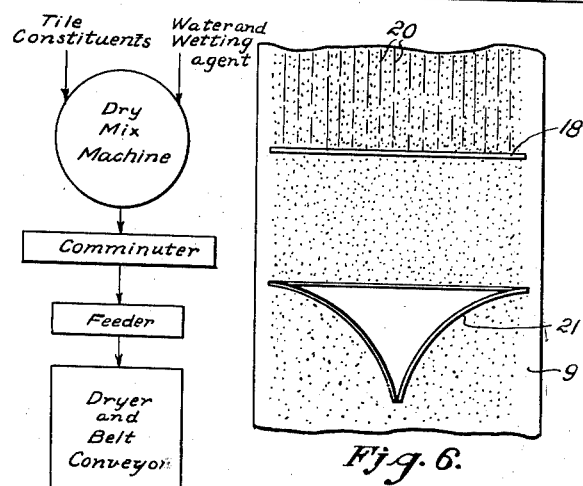
Figure 4:
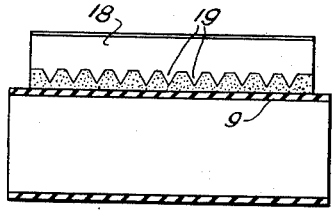
Figure 5:
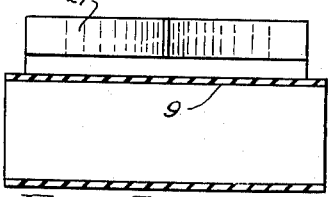

The invention will be described with references to the accompanying drawings in which:

Figure 1 is a diagrammatic flow sheet of the process in accordance with the present invention, Figure 2 is a diagrammatic elevation view of an apparatus to carry out the process of the invention, Figure 3 is a diagrammatic plan view showing the layout of the belt conveyor and drier arrangement, Figure 4 is a sectional view taken along the line 4—4, Figure 5 is a sectional view taken along the line 5—5, and Figure 6 is a plan view of the detail shown in Figure 5.

In accordance with this invention and referring to the flow sheet as shown in Figure 1, the finely divided, approximately —200 mesh, tile constituents, or ingredients, namely, talc, clay, pyrophollite, etc., preferably with any normal wetting agent and 9 to 15% water to make the particles adhere to each other, are added to a suitable dry mix machine and thoroughly mixed for 10 to 15 minutes. It has been found that it is not only practicable but desirable to add an excess of water, as set forth above, to the batch being dry mixed. 10.5% gives good results with normal mixtures when a wetting agent is used. The thoroughly mixed materials, now substantially in lump form, are crushed by a suitable comminutor, such as a hammer mill, to a grain size varying from $\frac{3}{4}$ to $\frac{1}{32}$ inch in diameter with about 5% —60 mesh. The crushed mixture is now dried by feeding it through suitable drying chambers on a conveyor belt system to reduce the moisture content to 6 to 8%. The wetting agent decreases the amount of water required to temper the constituents and also increases the rate of evaporation of the water during the drying period.

On drying the evaporation of the water tends to cause some crumbling and breaking up of the granules or grains. The dried materials are reduced to the desired size by crushing in any suitable apparatus, such as differential speed rolls, which provides granules and is screened to remove any granules over 8 mesh in size which are returned to the rolls for further crushing. The conditioned granules are cooled, stored in tanks, and are ready for immediate die pressing into green tile without any further processing or ageing.

An apparatus to carry out the improved process is shown in Figure 2. A dry mix machine or muller 1 mixes the water, wetting agent and tile constituents and discharges the mixture through a vibrating hopper 2 to a comminutor, such as a hammer mill, 3 or the like. The comminutor, which is set to produce granules $\frac{3}{4}$ inch or less in size, discharges the crushed material into a feeder 4 where it is fed onto a conveyor belt 5. The feeder 4 is provided with an opening 6 which adjusts the depth of the bed of material on the conveyor belt. The preferred depth of bed is $\frac{1}{2}$ to $1\frac{1}{2}$ inches.

Conveyor 5, supported by posts 7 at either end carries the crushed mixture and delivers it through a transfer chute 8 which feeds an oppositely travelling conveyor 9. Conveyor 9, supported by posts 10, carries the mixture and delivers it to transfer chute 11 which in turn feeds an oppositely travelling conveyor 12. Conveyor 12, supported by brackets 13, discharges the mixture through a set of differential speed crushing rolls 14 to a hopper 15 where the mixture is classified by a vibrating screen 16, the oversize being recrushed and the desired processed material stored in a storage tank 17 ready for the tile pressing machine. The gravity transfer of the material vertically through chutes 8 and 11 stirs up the material and thus tends to expose new surfaces of the grains on each conveyor belt. Stationary rakes 18 are provided on each conveyor belt. The rakes 18 have teeth 19, Figure 4, which make longitudinal furrows 20, Figure 6, in the bed of material and hence expose a greater surface area. A spreader 21, shown in detail in Figures 5 and 6, is provided at the beginning of each of conveyors 9 and 12 immediately in front of rakes 18 to spread the material and regulate its depth.

A drying chamber 22 having sources of heat 23 is provided over each of the conveyor belts. Any source of heat may be used but radiant heat as supplied by infrared lamps or infrared gas burners is preferred. The hot moist air rising from the material being dried may be drawn off and/or hot arid gas, if desired, may be blown or drawn through the ducts 24 over the moving bed of material to assist in the removal of moisture. The rate of evaporation is also increased if a wetting agent is added with the water at the muller. The furrows produced by the rakes 18 and the mixing at the transfer chutes 8 and 11 further aids in the removal of moisture.

The moisture content of the mixture on discharge is not substantially less than 6 nor more than 8%, preferably 7.0–7.75%. In the preferred process the length of time on the conveyor belt should be equal to the time of mulling, i. e. from 10 to 15 minutes. It will be seen that a very close control of the moisture content is thus obtained and may be controlled within ¼% from batch to batch which is important for automatic pressing.

A three step conveyor system, as shown, is the preferred arrangement since such an arrangement gives good results and requires a relatively small space. A single conveyor belt of suitable length and speed direct from the feeder to the rolls would provide the same resultant material.

After the moisture content has been reduced to the required level it is passed through the set of crushing rolls 14 which breaks up the oversize grains and produces a granular product. It has been found that it is necessary to revolve the crushing rolls 14 at a differential speed otherwise flakes rather than granules will be produced. The preferred diameter of the rolls is 9 to 12 inches and the preferred peripheral speed of the fast roll is 485 feet per minute, i. e. 185 R. P. M. for a 10 inch roll and the preferred peripheral speed of the slow roll is 232 feet per minute or 90 R. P. M.

The R. P. M. of the fast roll may vary from 175–200 and of the slow roll from 100–50.

It is desirable to allow sufficient time from the hot end of the conveyor for the materials to cool, either on an unheated section of the belt or by a sufficiently long drop through the rolls and vibrating screen. This cooling period allows the release of any excess of warm moist vapours that may be rising from the mixture and thus eliminates the tendency for excessive condensation on the metal storage tanks. The final temperature of the material delivered to the storage tanks should not exceed room temperature +10 degrees.

The mixture as produced contains the desired amount of graded grains and only a very small percentage of dust-like particles.

The addition of 9–15% of water to the muller decreases the fluffiness of the tile ingredients and hence the capacity of this machine is not only doubled but mixes more efficiently in a shorter time. Moreover the extra water makes the particles adhere to each other to give large grains or granules and even large lumps which are broken by the hammer mill. The grains are further broken on drying and by the crushing rolls to produce a final product which has a greatly increased bulk density. For example, the weight of a cubic foot of material prepared by this process is 63 to 68 lbs. which is 30% heavier than the weight of a cubic foot of material produced by the "Wet Mix" process having a like amount of moisture and twice as heavy as a cubic foot of material produced by the "Dry Mix" process. The increase in bulk density is important in the tile pressing machine in that the depth of the die cavity is reduced to about one-half that required by material produced by the "Dry Mix" process, and this means that there is only a fraction of the amount of air to be expelled from the material with the elimination of laminations.

In the operation of automatic tile presses it has been found that runs of 60 to 90 minutes are made without any die sticking when materials produced by this process are provided as a feed, whereas a run of 12 minutes was considered good using materials prepared by either of the previously known methods.

The tile produced from the material prepared by this invention is much stronger than those previously produced and all corners are extremely hard since it is easy to obtain an excellent die fill. This results in very low losses due to breakage during handling in the firing, glazing and refiring operations.

Because of the high percentage of graded granules present and the close moisture control differential shrinkage in firing with resultant pock marking of the tile is eliminated.

What is claimed is:

1. A process for conditioning finely divided materials for the manufacture of tile and the like which comprises the successive steps of forming a mixture of finely divided dry materials comprising clays and non-plastic substances and water to bring the moisture content to substantially 9 to 15%, thoroughly stirring the moist mixture, crushing the mixture, drying the mixture until the moisture content is reduced to substantially 6 to 8%, crushing and screening the dried mixture to produce a graded granular aggregate, the final size of the granules not exceeding 8 mesh.

2. A process as claimed in claim 1 wherein a wetting agent is added with the water.

3. A process as claimed in claim 1 wherein said water is added in sufficient amount to bring the moisture content to 10.5%.

4. A process as claimed in claim 1 wherein said drying reduces the moisture content of 7 to 7.75%.

5. A process as claimed in claim 1 wherein the mixture from the first crushing step is ¾ to $\frac{1}{2}$ inch in diameter with 5% —60 mesh.

6. In the process of manufacturing tile the improvement which comprises the successive steps of mixing the tile ingredients comprising finely divided dry clays and non-plastic substances in the presence of 9 to 15% water, crushing the mixture, drying the crushed mixture to reduce the moisture content to less than 8%, crushing and screening the dried mixture to produce a graded granular aggregate for die pressing into tile, the final size of the granules not exceeding 8 mesh.

7. A process for conditioning and granulating tile ingredients which comprises the successive steps of adding a wetting agent and water to finely divided dry clays and non-plastic substances in sufficient amount to produce a mass having a moisture content of 9 to 15%, thoroughly mixing the mass to produce a lumpy mixture, crushing said mixture to produce granules of ¾ to 1/32 inch in diameter, drying said granules to reduce the moisture content of 6 to 8%, crushing and screening the dried granules to a size not exceeding 10 mesh.

JAMES I. McASKILL.

REFERENCES CITED

The following references are of record in the file of this patent:

UNITED STATES PATENTS

| Number | Name | Date |
|---|---|---|
| 309,766 | Christiansen | Dec. 23, 1884 |
| 338,465 | Bayer et al. | Mar. 23, 1886 |
| 1,184,656 | Newhouse | May 23, 1916 |
| 1,187,702 | Boss | June 20, 1916 |
| 1,413,116 | Hickey | Apr. 18, 1922 |
| 1,592,342 | Church | July 13, 1926 |
| 1,784,462 | Miller | Dec. 9, 1930 |
| 2,110,851 | Symons | Mar. 8, 1938 |

FOREIGN PATENTS

| Number | Country | Date |
|---|---|---|
| 60,088 | Denmark | Aug. 24, 1942 |